(12) United States Patent
Hagano

(10) Patent No.: US 8,899,285 B2
(45) Date of Patent: Dec. 2, 2014

(54) FUEL TANK OPENING AND CLOSING DEVICE

(75) Inventor: Hiroyuki Hagano, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 496 days.

(21) Appl. No.: 13/355,972

(22) Filed: Jan. 23, 2012

(65) Prior Publication Data

US 2012/0192994 A1 Aug. 2, 2012

(30) Foreign Application Priority Data

Jan. 31, 2011 (JP) .................................. 2011-017851
Mar. 30, 2011 (JP) .................................. 2011-074776

(51) Int. Cl.
*B65B 1/04* (2006.01)
*B60K 15/04* (2006.01)

(52) U.S. Cl.
CPC ............. *B60K 15/04* (2013.01); *B60K 15/0406* (2013.01); *B60K 15/0409* (2013.01); *B60K 2015/0483* (2013.01)
USPC .......................................... 141/350; 220/86.2

(58) Field of Classification Search
CPC ........... B60K 15/0406; B60K 15/0409; B60K 15/04; B60K 2015/0483
USPC ........................................... 141/350; 220/86.2
See application file for complete search history.

(56) References Cited

U.S. PATENT DOCUMENTS

| 5,439,129 | A | * | 8/1995 | Buechler ..................... 220/86.2 |
| 6,968,874 | B1 | | 11/2005 | Gabbey et al. |
| 7,883,137 | B2 | | 2/2011 | Bar |
| 2010/0218849 | A1 | | 9/2010 | Hagano |

FOREIGN PATENT DOCUMENTS

JP 2010-234928 A 10/2010

* cited by examiner

*Primary Examiner* — Jason K Niesz
(74) *Attorney, Agent, or Firm* — Posz Law Group, PLC

(57) ABSTRACT

A fuel tank opening-closing device is equipped with a flap valve mechanism 20 and an opening-closing activation mechanism. The opening-closing activation mechanism comprises a nozzle detection mechanism that has a first detection parts and a second detection parts. The first detection parts are linked with the locking member and the locked part so as to move the lock engaging part and the locked engagement part while maintaining each of the overlap widths within the preset range, being pressed by the end of the fueling nozzle. The second detection parts are linked to the locking member so as to move from the locked position to the unlocked position by releasing the overlap width by being pressed by the end of the fueling nozzle.

16 Claims, 16 Drawing Sheets

FUEL TANK OPENING AND CLOSING DEVICE

This application claims the benefit of and priority from Japanese Application No. 2011-17851 filed Jan. 31, 2011, and No. 2011-74776 filed Mar. 31, 2011, the contents of which are incorporated herein by reference.

BACKGROUND OF THE INVENTION

1. Field of the Invention

The present invention relates to a fuel tank opening-closing device for supplying fuel to a fuel tank, which opens a flap valve using the insertion force of a fueling nozzle.

2. Description of the Related Art

Fuel tank opening-closing devices are disclosed in JPA2010-195344 and JPA2010-522118. The fuel tank opening-closing devices are equipped with a shutter mechanism for opening and closing an insertion path of a tank opening forming member, and an opening-closing activation mechanism which permits the opening operation of the shutter mechanism. The opening-closing activation mechanism is equipped with a nozzle detection mechanism and a locking mechanism. The locking mechanism has lock engaging members which are disposed at both sides of the insertion path and engage or release parts of the outer circumference of the flap valve. When the fueling nozzle is inserted during fueling, by the end of the fueling nozzle touching the nozzle detection member, the lock engaging member is moved outward in the radial direction, and then being moved from the locked position to the unlocked position, permits the opening operation of the shutter mechanism. Then the shutter is opened by pressing with the end of the fueling nozzle, and fueling is performed.

However, in the related fuel tank opening-closing device (JPA2010-195344), when the insertion path diameter has been made larger to deal with variation in the outer diameters of fueling nozzles, there was the problem that the nozzle detection member touches only one of the lock engaging parts and releases the locked position, not touched other of the lock engaging parts. Therefore, it was difficult for the other of locking member to be released from the locked position.

A pressure regulating valve is stored in the opening-closing member shown in JPA2010-522118. The pressure regulating valve adjusts pressure to within a preset pressure range in the insertion path and fuel passage in a state when the opening-closing member closes the inlet. The opening-closing member had the problem that when the pushing force by the end of the fueling nozzle is great, and reaches the point of damaging the opening-closing member, it is easy to have damage on the function of the pressure regulating valve. Because of that, the mechanical strength of the opening-closing member has to be set high.

SUMMARY

An advantage of some aspects of the invention is to provide a fuel tank opening-closing device that can handle variations in the outer diameters of fueling nozzles during fueling and that can reliably valve opening and closing of the perform flap.

Another advantage of some aspects of the invention is to provide a fuel tank opening-closing device that is a flap valve mechanism equipped with an opening-closing member that has a pressure regulating valve and that opens and closes by being pressed by the end of the fueling nozzle, and that has little effect on the pressure regulating valve even when a large force is received by the opening-closing member by being pressed by the end of the fueling nozzle.

According to an aspect of the invention, there is to provide a fuel tank opening-closing device for opening and closing a path for supplying fuel to a fuel tank. The fuel tank opening-closing device comprises: a tank opening forming member that includes a fuel path connected to the fuel tank, an insertion path for inserting a fueling nozzle, and an inlet disposed between the fuel path and the insertion path; a flap valve mechanism that is disposed inside the tank opening forming member, and has an opening-closing member for opening and closing the inlet by being pressed by an end of the fueling nozzle; and an opening-closing activation mechanism that can switch a locked position and an unlocked position, wherein the locked position is a position in which the opening operation of the opening-closing member is locked, and the unlocked position is a position in which the opening operation of the opening-closing member is permitted by pressing operation of the fueling nozzle. The opening-closing activation mechanism includes: a nozzle detection mechanism mounted on the tank opening forming member and disposed facing the insertion path, having a first detection part and a second detection part for receiving movement force in an insertion direction by the fueling nozzle, wherein the first detection part is positioned further to an insertion side of the insertion path than the second detection part and is disposed with a greater inner diameter than the second detection part; and a locking mechanism having a locking member which has lock engaging parts disposed at a periphery of the inlet and a locked part having locked engagement parts that engage and disengage respectively with the lock engaging parts with an overlap width within a preset range, the locking mechanism being configured to selectively taking the unlocked position and the locked position by engaging and disengaging with the lock engaging part and the locked engagement part.

The first detection parts are linked with the locking member and the locked part so as to move the lock engaging part and the locked engagement part while maintaining each of the overlap widths within the preset range, being pressed by the end of the fueling nozzle, and the second detection parts are linked to the locking member so as to move from the locked position to the unlocked position by releasing the overlap width by being pressed by the end of the fueling nozzle.

With the fuel tank opening-closing device of the application example, when the fueling nozzle is inserted to almost the center of the insertion path of the tank opening forming member, it passes between first detection parts, and the end of the fueling nozzle presses the second detection part of the nozzle detection mechanism. The second detection part which is pressed by the end of the fueling nozzle moves the locking member of the locking mechanism from the locked position to the unlocked position, and sets to a state for which the opening-closing member opening operation is permitted. Furthermore, when the fueling nozzle is pushed in, the opening-closing member of the flap valve mechanism performs the opening operation, and by doing this, fuel is supplied from the fueling nozzle to the fuel passage. When fueling ends, and the fueling nozzle is removed from the fuel passage and insertion path, the locking member engages with the locked part. By doing this, the opening-closing member returns to the initial state in the locked position with the inlet closed.

Also, with the application example, with the opening-closing activation mechanism, when the fueling nozzle is inserted in a state with the position displaced from the center axis of the insertion path, the end of the fueling nozzle touches one of the first detection parts of the nozzle detection member, links to this first detection part, and simultaneously with the other first detection part moving in the same direction, a moving alignment operation is performed while maintaining a constant overlap width for the locking member lock engaging part and the locked part locked engagement part of both sides. Then, after the alignment operation has ended, the end of the fueling nozzle is pressed simultaneously on the second detection parts of both sides, the locking mechanism is moved to the unlocked position so as to release the overlap width simultaneously, and it is possible to do the opening operation of the opening-closing member of the flap valve mechanism. Therefore, the fueling nozzle being inserted separated from the center axis of the insertion path, the end of the fueling nozzle pushing only one of the introductory push parts so only one of the overlap widths is released and only the other overlap width is kept does not occur, in other words, it is possible to reliably perform the operation of opening the flap valve mechanism without the occurrence of the problem of only one of the unlocked positions not being released.

Also, even if a large allowed dimension is set for the internal diameter of the second detection part, in other words, the internal diameter set for doing the opening and closing operation of the flap valve mechanism with only specified nozzle diameter fueling nozzles, the alignment operation is done by the first detection part and the locking mechanism, so the end of the fueling nozzle can reliably push the second detection parts of both sides for which the internal diameter is stipulated. Thus, to lead the fueling nozzle to the correct detection position, it is not necessary to have the internal diameter be a strict dimension tolerance, in other words, it is possible to have an insertion path for which the allowed dimension of the internal diameter is larger, so it is possible to handle variations in the external diameters of the fueling nozzles, making the work of inserting the fueling nozzle easy.

Furthermore, the nozzle detection mechanism is equipped with a second detection part disposed so as to be pressed when the external diameter of the end of the fueling nozzle is a specified diameter or greater, so in the case of a light oil fueling nozzle, the flap valve mechanism opening-closing member performs the opening operation, but in the case of a gasoline fueling nozzle, the opening-closing member does not perform the opening operation. Specifically, the end of the gasoline fueling nozzle is displaced from the center axis and inserted in the insertion path, and even when the first and second detection parts of one of the introductory push parts is pressed, the other introductory push part is not pressed, and the unlocked position is not released. Therefore, when the type of fuel is different according to the external diameter of the fueling nozzle, the inlet does not open, so supplying of the wrong type of fuel does not occur.

Also, the locking member can have a constitution equipped with a linking arm for cooperating with the nozzle detection member and for linking the lock engaging parts of both sides. By doing this, it is possible to move the lock engaging parts of both sides simultaneously and to reduce the number of parts.

As another application example, it is possible to have a constitution for which an introductory push part, the lock engaging part cooperating with the introductory push part, and the locked engagement part are respectively disposed at both sides in the diameter direction of the insertion path. As another application example, it is also possible to use a constitution with which the nozzle detection member supports the end part of the detection support unit to be able to rotate in relation to the tank opening forming member with the shaft.

As yet another application example, it is possible to have a constitution for which the opening-closing member is equipped with a pressing member pressed by the end of the fueling nozzle, and a cover with support that allows the pressing member to slide in the diameter direction, and the pressing member is equipped with a locked part. With this constitution, it is possible to use a constitution equipped with a return spring for returning the pressing member to the center position of the opening-closing member after sliding.

Also, as another application example, it is possible to have a constitution for which the opening-closing member is equipped with a pressing member pressed by the end of the fueling nozzle, and a cover that forms a space with that pressing member, and the locked part is stored to be able to slide in the radial direction in that space. With this constitution, it is possible to have a constitution equipped with a return spring for returning the locked part to the center position of the opening-closing member after sliding.

With the fuel tank opening-closing device of another application example, the inlet formed on the tank opening forming member is closed by the flap valve mechanism opening-closing member. In a state with the opening-closing member having closed the inlet, the pressure regulating valve provided on the opening-closing member adjusts the pressure of the insertion path and the fuel passage to within a preset pressure range. Also, when the fueling nozzle is inserted in the insertion path of the tank opening forming member, the end of the fueling nozzle presses the pressing member of the opening-closing member. The opening-closing member pressed by the end of the fueling nozzle performs the operation of opening the inlet, and by doing this, fuel is supplied from the fueling nozzle to the fuel tank via the fuel passage. With the opening-closing member, the location pressed by the end of the fueling nozzle is the pressing member. The pressing member is a member disposed at the insertion path side in relation to the cover that forms the valve chamber, and since it protects the cover and valve that constitute the pressure regulating valve, there is no big force applied from the fueling nozzle onto the pressure regulating valve or the like. Also, even if the pressing member receives a large force from the fueling nozzle and is damaged, the pressure regulating valve doesn't easily reach the point of damaging the cover, so there is no interference with its operation. Thus, it is not necessary to set the mechanical strength of the cover high to protect the pressure regulating valve.

The pressing member of another application example can have a constitution for which it is mounted on the valve chamber defining member as a separate member from the cover. With this constitution, not only is it possible to exchange it when the pressing member is damaged, but since the pressure regulating valve is protected by the cover, there is no being affected by it.

With another application example, it is possible to have a constitution with which the opening-closing member is equipped with a sliding mechanism for which the pressing member is supported to be able to slide in relation to the cover. With this constitution, when excessive force is applied to the pressing member from the fueling nozzle, by the pressing member sliding in relation to the cover, the force applied to the pressing member is allowed to escape, and it is possible to prevent damage to the pressing member.

With the application example, this is further equipped with opening-closing activation mechanism that can switch between a locked position in which the opening operation of the opening-closing member is locked, and an unlocked position in which the opening operation of the opening-closing member is permitted when it is pushed by the fueling nozzle, wherein the opening-closing activation mechanism is equipped with a nozzle detection mechanism mounted on the opening forming member and disposed facing the insertion path, having a nozzle detection member for receiving the insertion direction movement force of the fueling nozzle, and a locking mechanism that has a locking member having a lock engaging part disposed at the periphery of the inlet, and a locked part having a locked engagement part that engages and disengages with the lock engaging part, and selectively takes the locked position and the unlocked position by, in cooperation with the nozzle detection member, engaging and disengaging the lock engaging part and the locked engagement part, and the locked part can have a constitution formed on the pressing member.

With this constitution, the pressing member can also be used as the locked part constituting the locking mechanism.

With yet another application example, the pressing member can be constituted to be equipped with a support leg that links the pressing member and the cover. The support leg can be constituted so as to be across a space that is a specified gap between the pressing member and the cover. With this constitution, the cover is disposed across the space in relation to the pressing member, and this space acts as a space for easing the external force applied to the pressing member, so it is possible to prevent damage to the cover.

Another application example is equipped with an opening-closing activation mechanism that switches between the locked position which locks the operation of opening the opening-closing member, and the unlocked position which allows the operation of opening the opening-closing member when pressed by the fueling nozzle, wherein the opening-closing activation mechanism has a nozzle detection mechanism that is mounted on the tank opening forming member and is disposed facing the insertion path, a locking member having a lock engaging part disposed at the periphery of the inlet, and a locked part having a locked engagement part which engages and disengages with the lock engaging part provided on the opening-closing member, and is equipped with a lock mechanism that is cooperates with the nozzle detection member and selectively takes the unlocked position from the locked position by engaging and disengaging between the lock engaging part and the locked engagement part, and the locked part can have a constitution whereby it is disposed to be able to slide in the space. With this constitution, the space is also used to store the locked part, so it is possible to have a compact constitution for the opening-closing member.

With yet another application example, it is possible to have a constitution for which a valve path connected from the insertion path to the valve chamber is formed between the pressing member and the cover.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
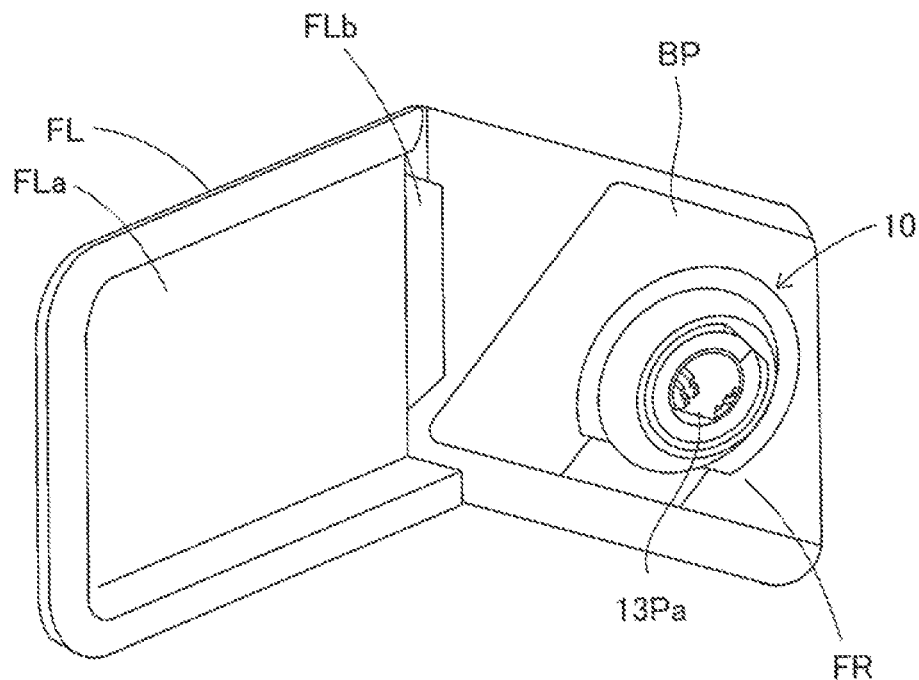
FIG. 1 is a perspective view showing an opening-closing device of a fuel tank of an embodiment of the present invention, showing a fueling lid in an open state.

A. First Embodiment (1) Schematic Constitution of the Fuel Tank Opening-Closing Device FIG. 1 is a perspective view showing an opening-closing device of a fuel tank of an embodiment of the present invention, and shows the fueling lid in an open state. At the rear part of the car body of the vehicle, a fueling lid FL for supplying fuel (light oil) is supported to be able to open and close. The fueling lid FL is supported so that a lid main body FLa following the outer panel of the car body is able to open and close at the outer panel of the car body via a hinge FLb. The space that opens for the fueling lid FL becomes a fueling chamber FR, and inside this fueling chamber FR is placed a fuel tank opening-closing device 10 supported on a base plate BP. The fuel tank opening-closing device 10 is a mechanism for supplying fuel to the fuel tank without using a fuel cap, and it is a mechanism that, after the fueling lid FL is opened, supplies fuel to the fuel tank from the fueling nozzle by opening and closing the fuel passage with external force from the fueling nozzle. Following, a detailed description of the constitution of the fuel tank opening-closing device will be described.

(2) Constitution and Operation of Each Part

Figure 2:
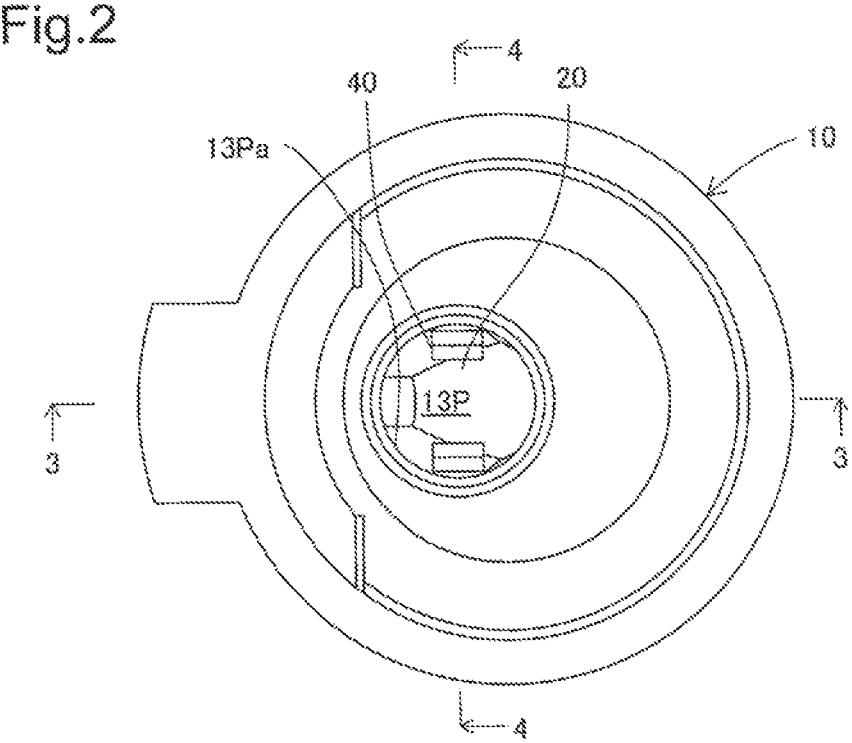
FIG. 2 is a plan view showing the opening of the fuel tank opening-closing device.
Figure 3:
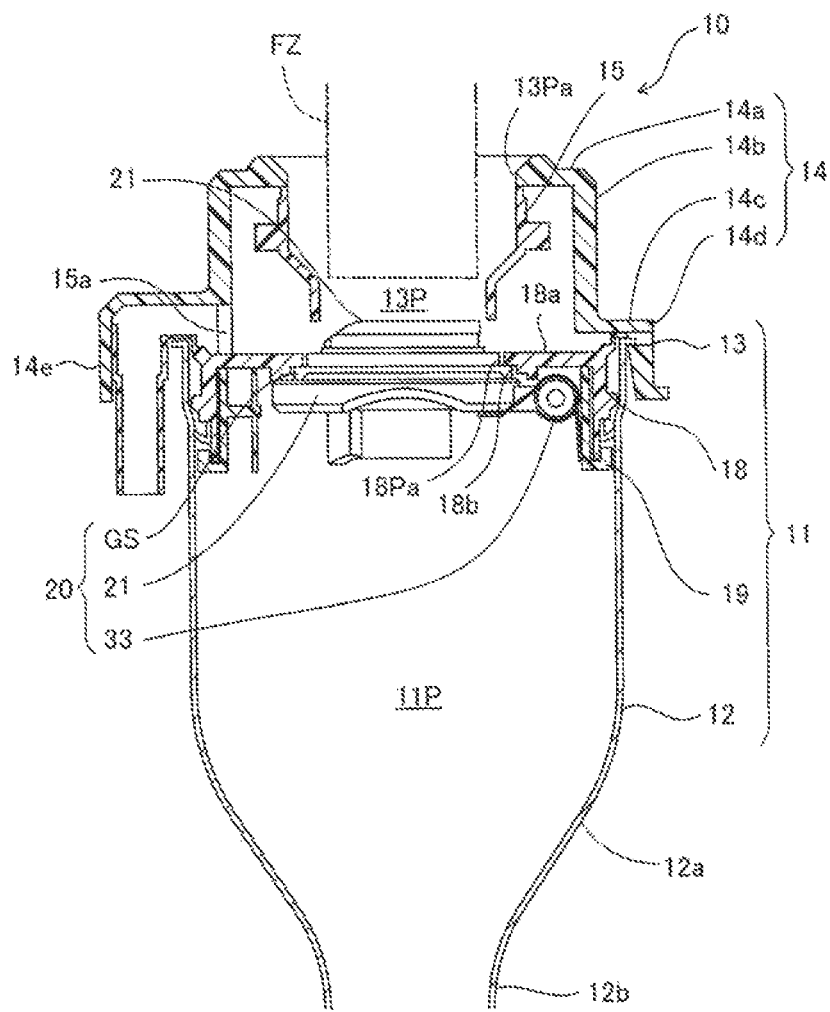
FIG. 3 is a cross section view along line 3-3 of FIG. 2.
Figure 4:
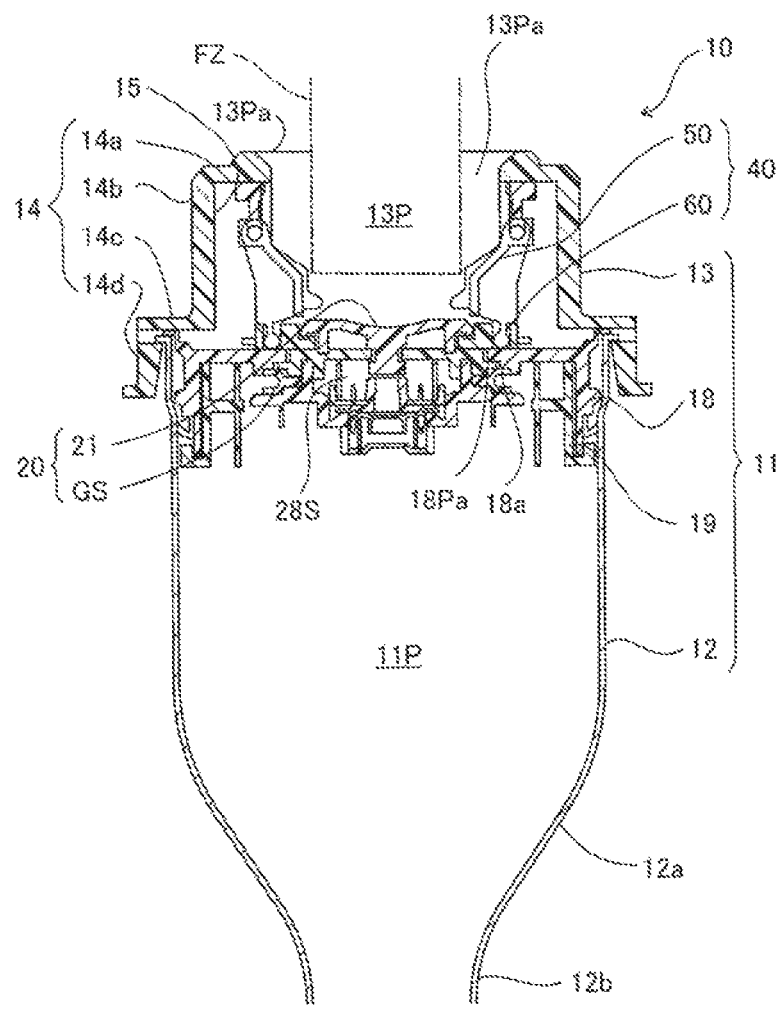
FIG. 4 is a cross section view along line 4-4 of FIG. 2.

FIG. 2 is a plan view showing the opening of the fuel tank opening-closing device 10, FIG. 3 is a cross section view along line 3-3 of FIG. 2, and FIG. 4 is a cross section view along line 4-4 of FIG. 2. In FIG. 3 and FIG. 4, the fuel tank opening-closing device 10 is equipped with a tank opening forming member 11 having a fuel passage 11P connected to the fuel tank (not illustrated), a flap valve mechanism 20, and an opening-closing activation mechanism 40 (FIG. 4) for opening and closing the flap valve mechanism 20.

(2)-1 Tank Opening Forming Member 11

The tank opening forming member 11 is a pipe unit having a fuel passage 11P, and is equipped with a metal connecting pipe 12 connected to the fuel tank, an opening forming member 13 fixed on the top part of the connecting pipe 12, an inlet forming member 18 mounted on the top part of the connecting pipe 12, and a mating part 19 mounted on the inlet forming member 18 to support the flap valve mechanism 20.

The connecting pipe 12 is equipped with a reduced diameter part 12a for which the fuel tank side is gradually reduced in diameter, and a straight tube part 12b connected to the reduced diameter part 12a, and these form a single unit. The opening forming member 13 is equipped with a cylindrical outer wall 14 on the top part of the connecting pipe 12, and an inner wall 15 disposed inside the outer wall 14, forming an insertion path 13P for inserting the fueling nozzle FZ.

The outer wall 14 is equipped with an upper face part 14a and a side wall 14b forming the introduction port 13Pa, which is formed in a cup shape. The bottom part of the outer wall 14 becomes a bottom part cylinder part 14d from the slightly broadened in diameter broadened diameter part 14c. Also, at part of the broadened diameter part 14c (the left side of the drawing), an ejection upper pipe 14e for ejecting fuel that overflowed during fueling from the insertion path 13P is provided projecting downward. The inner wall 15 is a wall surface forming the insertion path 13P, and its opening becomes the introduction port 13Pa. Also, on the inner wall 15, a path opening 15a is formed. The path opening 15a forms a path connecting from the insertion path 13P to the ejection upper pipe 14e, and prevents fuel from pooling in the insertion path 13P.

The inlet forming member 18 is fixed to the top part of the connecting pipe 12 by engaging with the mating part 19 formed in a tube shape, this is a member for supporting part of the flap valve mechanism 20, and is equipped with a circular plate part 18a having an inlet 18Pa which forms part of the fuel passage 11P.

(2)-2 Flap Valve Mechanism 20

As shown in FIG. 3, the flap valve mechanism 20 is equipped with an opening-closing member 21, a spring 33, and a gasket GS. The opening-closing member 21 is axially supported on the inlet forming member 18 and the mating part 19, and is a member for opening and closing the inlet 18Pa. The spring 33 is a coil spring, one end part of that coil shape is supported on the mating part 19, and the other end part is supported on the opening-closing member 21 and energized in the direction that closes the opening-closing member 21.

Figure 5:
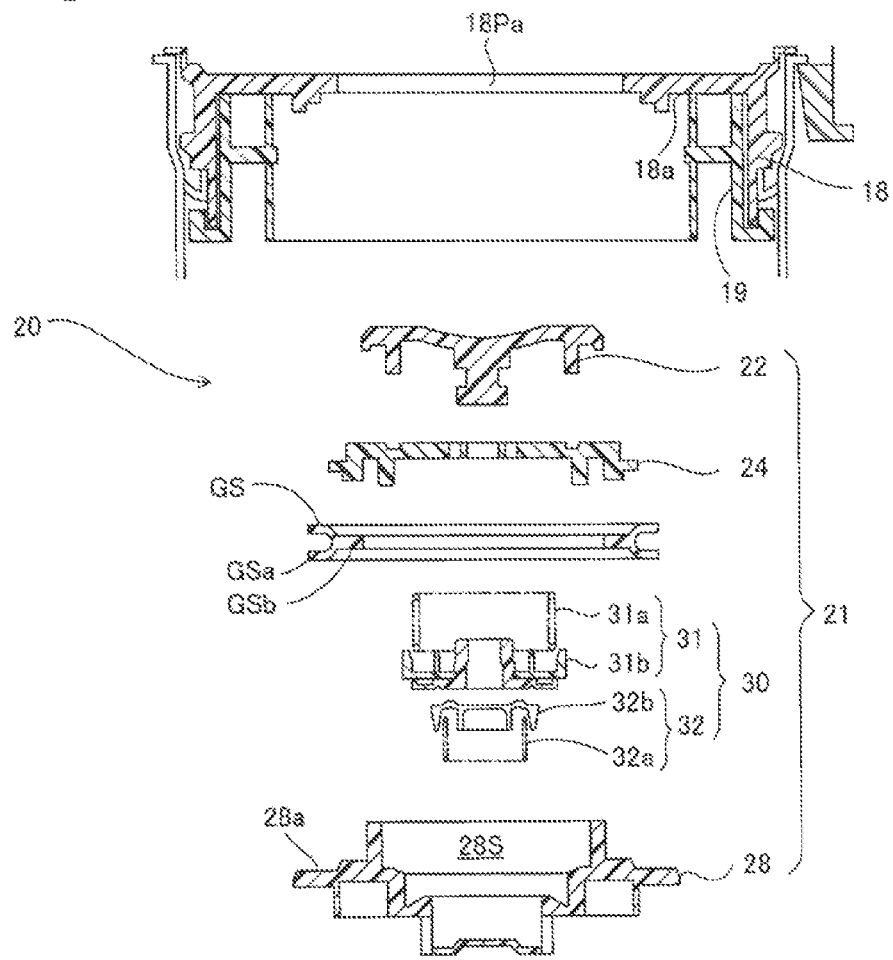
FIG. 5 is an exploded cross section view of the flap valve mechanism and its peripheral members.
Figure 6:
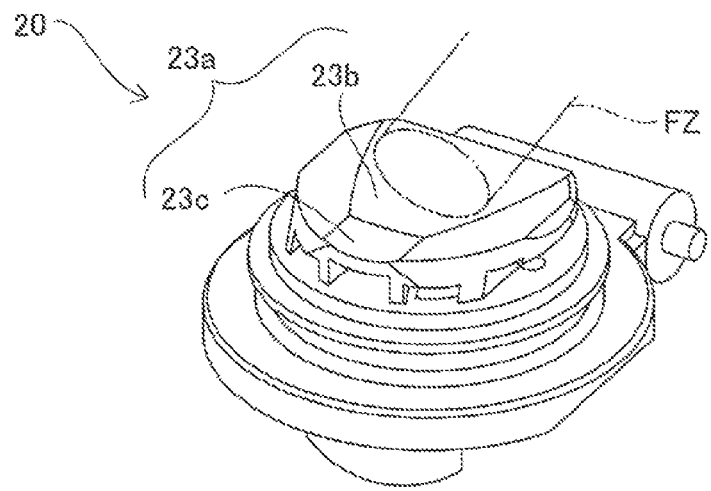
FIG. 6 is a perspective view showing the flap valve mechanism.
Figure 7:
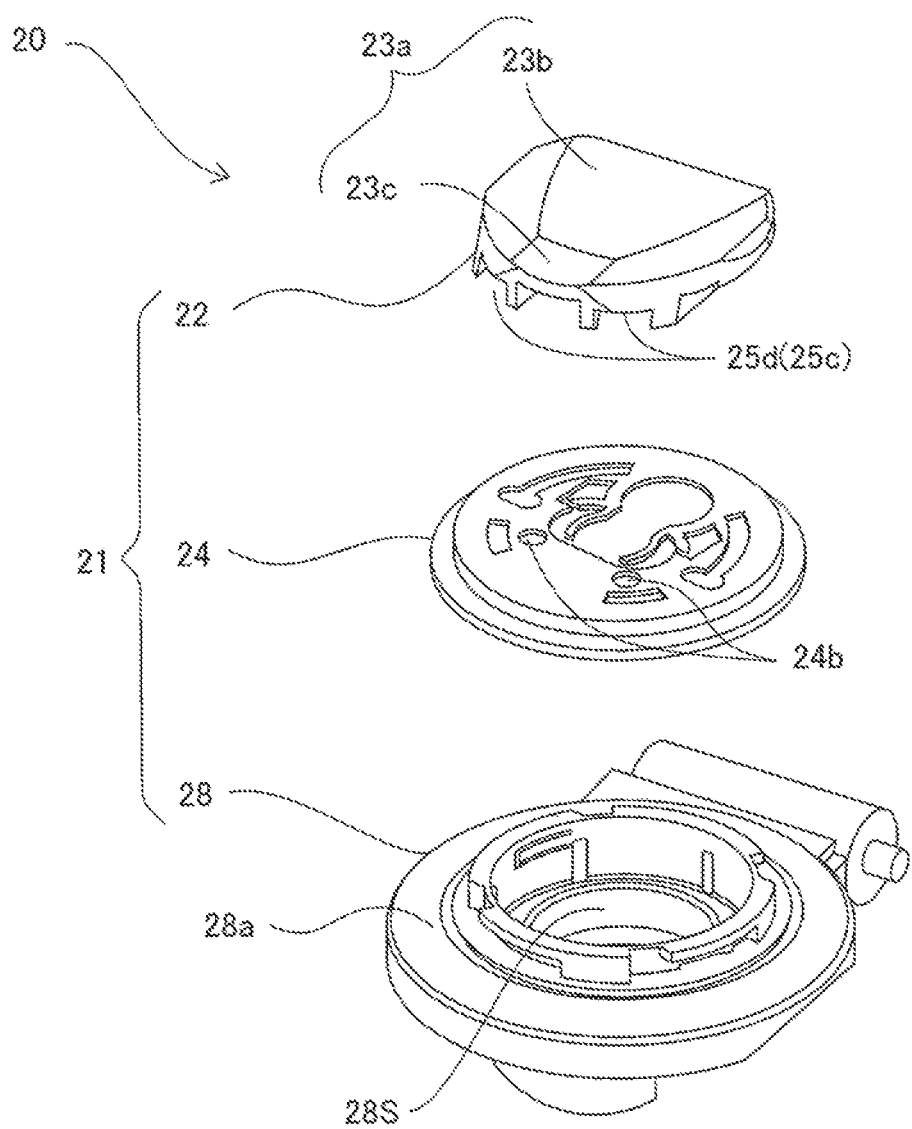
FIG. 7 is an exploded perspective view of the flap valve mechanism.

FIG. 5 is an exploded cross section view of the flap valve mechanism 20 and the members in its vicinity, FIG. 6 is a perspective view of the flap valve mechanism 20, and FIG. 7 is an exploded perspective view of part of the flap valve mechanism 20. In FIG. 5, the opening-closing member 21 is equipped with a pressing member 22, a cover 24, a valve chamber defining member 28, and a pressure regulating valve 30. As shown in FIG. 6, the pressing member 22 is disposed at the insertion path 13P side from the cover 24, is formed by a separate member from the valve chamber defining member 28, is an almost cylindrical shaped member that directly receives the pressing force of the fueling nozzle FZ, is formed from conductive resin, and is equipped with an upper face part 23. On the upper face part 23 is formed a guide curved surface 23a for smoothing the touching of the fueling nozzle FZ and also for positioning the fueling nozzle FZ. The guide curved surface 23a is equipped with an introduction guide surface 23b that the end of the fueling nozzle FZ first touches during insertion of the fueling nozzle FZ, and an inclined support surface 23c that touches the side surface of the fueling nozzle FZ after the fueling nozzle FZ is inserted to a specified point or more and has passed across the introduction guide surface 23b.

Figure 8:
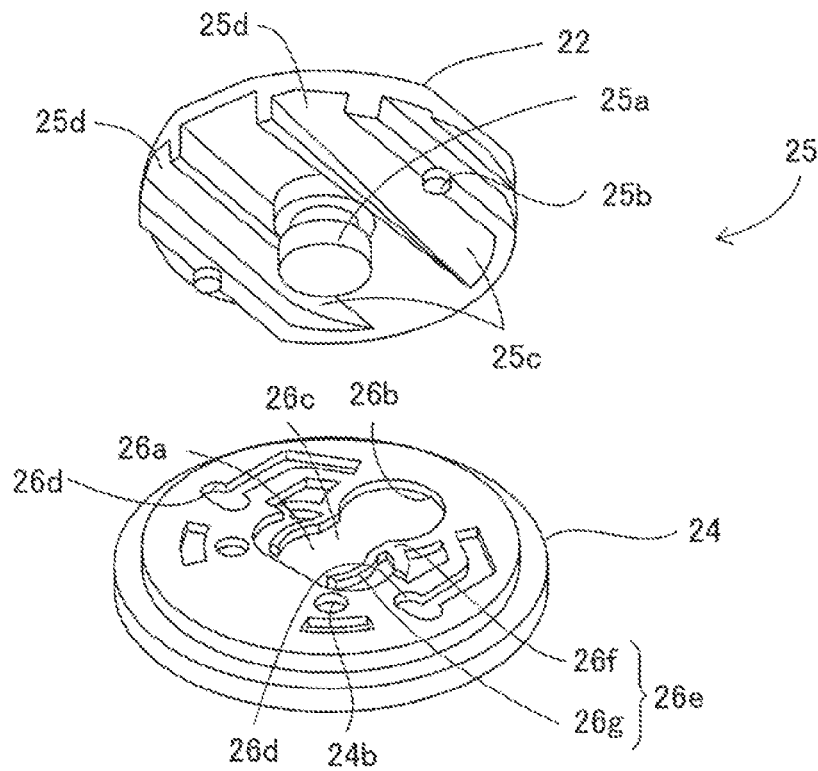
FIG. 8 shows the sliding mechanism.
Figure 9:
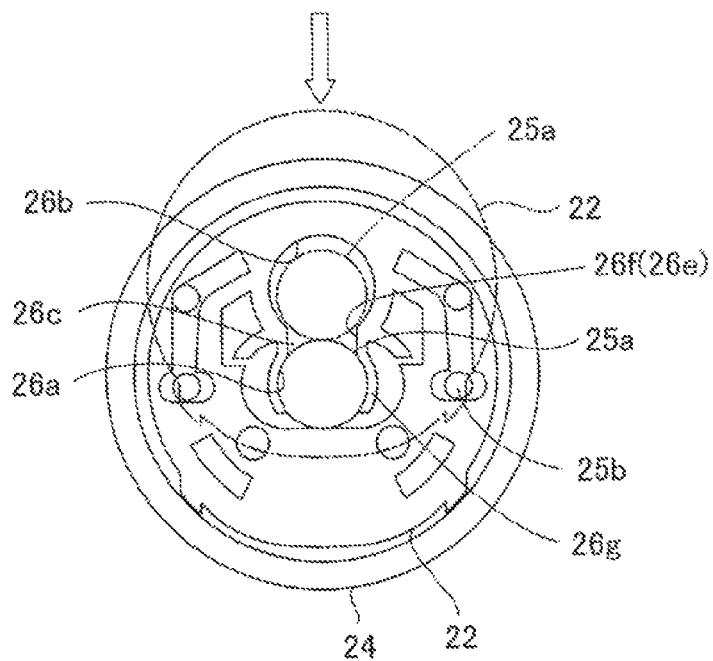
FIG. 9 shows the sliding mechanism assembly operation.

As shown in FIG. 7, the cover 24 is a two-level disk shaped member fixed by engaging with the top part of the valve chamber defining member 28, and constitutes the sliding mechanism 25 (FIG. 8) that supports the pressing member 22 to be able to slide in the radial direction, as well as the pressing member 22. FIG. 8 is an explanatory drawing for explaining the sliding mechanism 25. Note that the pressing member 22 shown in FIG. 8 is shown tilted in relation to the cover 24 so as to show its bottom surface side. The sliding mechanism 25 is equipped with, on the back surface of the pressing member 22, a first supported projection 25a provided projecting to the center of this pressing member 22, and a second supported projection 25b provided projecting at both sides of the first supported projection 25a, and meanwhile, on the cover 24, equipped are a first support hole 26a formed at the center of this cover 24, a guide hole 26b connected via a connecting slot 26c to the first support hole 26a, and a second support hole 26d disposed at both sides of the first support hole 26a. The first support hole 26a is a slot that expands in the diameter direction, and a flexing piece 26e is provided projecting so as to enclose part of the center. The flexing piece 26e consists of a cantilever beam, and midway this has a detent 26f projecting toward the connecting slot 26c, and a clipping part 26g disposed so as to enclose part of the center of the first support hole 26a, and the first supported projection 25a is supported so as to be sandwiched from both sides. The second support hole 26d is a slot that expands in the radial direction the same as the first support hole 26a, and the second supported projection 25b of the sliding mechanism 25 is inserted and supported to be able to slide. As shown in FIG. 9, to assemble the pressing member 22 on the cover 24, the first supported projection 25a of the pressing member 22 is inserted in the guide hole 26b of the cover 24, and the second supported projection 25b is inserted in the second support hole 26d, and the pressing member 22 is moved toward the center of the cover 24. By doing this, when passing through the connecting hole 26c, the first supported projection 25a of the sliding mechanism 25 flexes the flexing piece 26e, passes the detent 26f and is gripped by the clipping part 26g.

Figure 10:
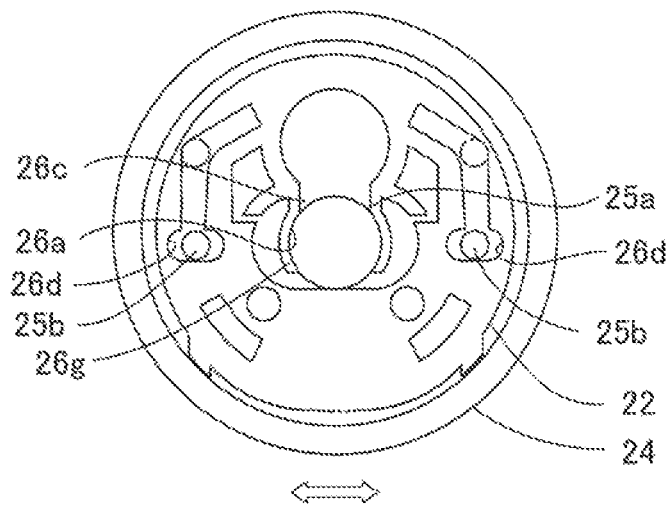
FIG. 10 shows the operation of the sliding mechanism.

As shown in FIG. 10, in a state with the pressing member 22 assembled on the cover 24, when force is applied on the pressing member 22 in the arrow direction which is the radial direction, the first supported projection 25a moves within the first support hole 26a while flexing the clipping part 26g, and the second supported projection 25b moves within the second support hole 26d. Meanwhile, when the force applied to the pressing member 22 is removed, the elastic force of the clipping part 26g is applied to the first supported projection 25a, and the pressing member 22 moves to the center of the cover 24. Note that we will describe the operation of the pressing member 22 sliding in the diameter direction in relation to the cover 24 in terms of its link to the opening-closing activation mechanism 40.

In FIG. 5, the valve chamber defining member 28 is a cup shaped concave area opened at the insertion path 13P side, and by the concave area being covered by the cover 24, a valve chamber 28S that stores the pressure regulating valve 30 is formed. The pressure regulating valve 30 is equipped with a positive pressure valve 31 having a positive pressure valve body 31b energized by a spring 31a, and a negative pressure valve 32 having a negative pressure valve body 32b energized by a spring 32a, and by opening and closing both valves, the fuel tank pressure is adjusted to within a preset pressure range between the insertion path 13P and the fuel passage 11P, and by doing this, the tank internal pressure of the fuel tank is adjusted to within a specified range. A flange 28a for supporting a gasket GS is formed on the outer periphery part of the valve chamber defining member 28. The gasket GS is formed from a rubber material, is equipped with a C-shaped seal main body GSa, and a support part GSb of the inner peripheral part of the seal main body GSa, the support part GSb is held in the opening-closing member 21 by being sandwiched between the top surface of the flange 28a and the bottom part of the cover 24, and the inlet 18Pa is sealed by the seal main body GSa pressing on the opening outer edge part of the inlet 18Pa.

In FIG. 8, a valve flow path connected to the valve chamber 28S from the insertion path 13P (see FIG. 4) side is formed between the pressing member 22 and the cover 24. Specifically, the valve flow path is equipped with a groove path 25c which is the back surface (bottom surface) of the pressing member 22 formed in parallel at both sides with the first supported projection 25a as the center, and a through hole 24b formed on the cover 24. At one side (the right side in the drawing) of the groove path 25c, an opening 25d is formed. Therefore, as shown in FIG. 7, the valve path is connected to the valve chamber 28S through the opening 25d, the groove path 25c, and the through hole 24b at the insertion path 13P side.

(2)-3 Opening-Closing Activation Mechanism 40

Figure 11:
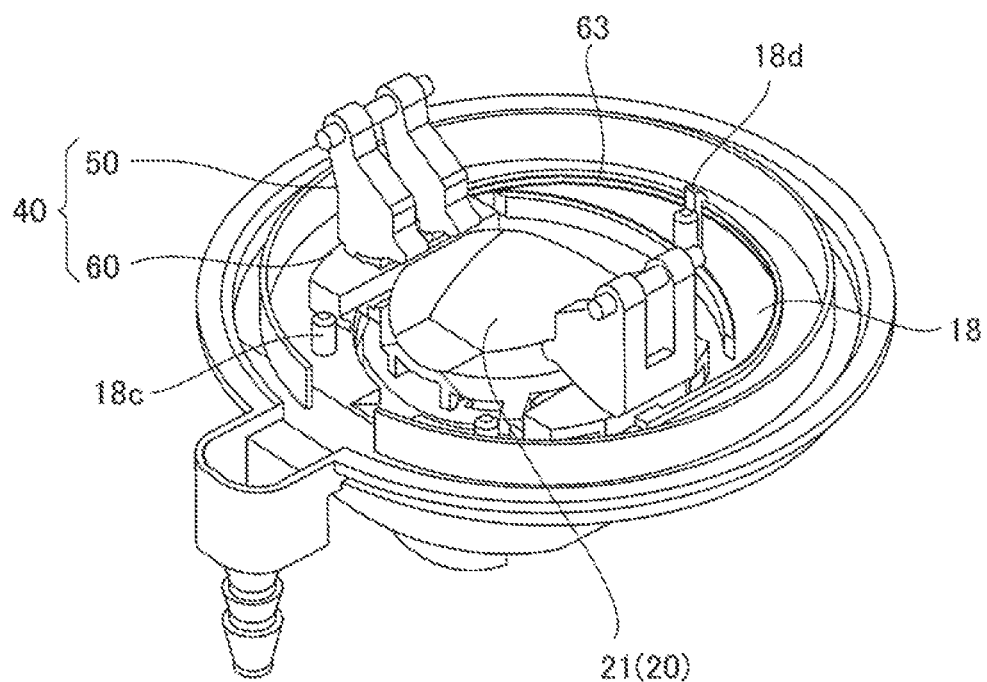
FIG. 11 is a perspective view showing the state with the opening-closing activation mechanism removed from the opening forming member.
Figure 12:
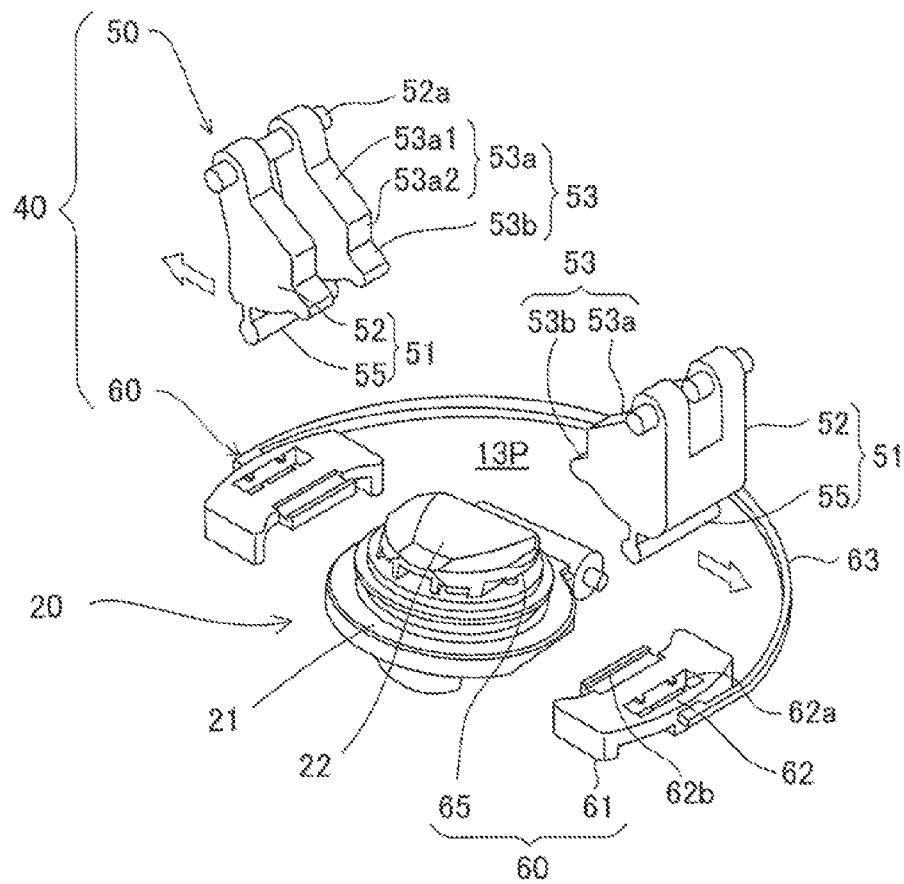
FIG. 12 is an exploded perspective view of the opening-closing activation mechanism.

FIG. 11 is a perspective view showing the state with the opening-closing activation mechanism 40 removed from the opening forming member 13 (FIG. 3), and FIG. 12 shows an exploded perspective view of the opening-closing activation mechanism 40. In FIG. 11, the opening-closing activation mechanism 40 is placed above and at the side of the opening-closing member 21 of the flap valve mechanism 20, and is a mechanism for performing the opening operation by being pressed by the end of the fueling nozzle, and as its major constituents, is equipped with a nozzle detection mechanism 50 and a locking mechanism 60.

In FIG. 12, the nozzle detection mechanism 50 is a mechanism that releases the locked position of the opening-closing member 21 of the flap valve mechanism 20 via the locking mechanism 60 by being pressed by the end of a fueling nozzle of a specified outer diameter, and is equipped with a nozzle detection member 51 supported on the opening forming member 13 (FIG. 4). There are two nozzle detection members 51 of the same shape disposed facing the insertion path 13P in the diameter direction of the insertion path 13P, and these are equipped with a detection support unit 52 and a cylindrical engaging part 55 which is formed as a single unit with the bottom part of the detection support unit 52. The detection support units 52 are almost triangular members in the shape viewed from the side, and the top parts thereof are connected by a shaft 52a. The shaft 52a is axially supported on the opening forming member 13, and the nozzle detection member 51 is disposed so as to be able to sway. Each detection support unit 52 is equipped with introductory push parts 53 facing the insertion path 13P and disposed at both sides thereof. Each of the introductory push parts 53 is equipped with a first detection part 53a tilted facing the insertion path 13P and downward, and a second detection part 53b disposed beneath the first detection part 53a.

Figure 13:
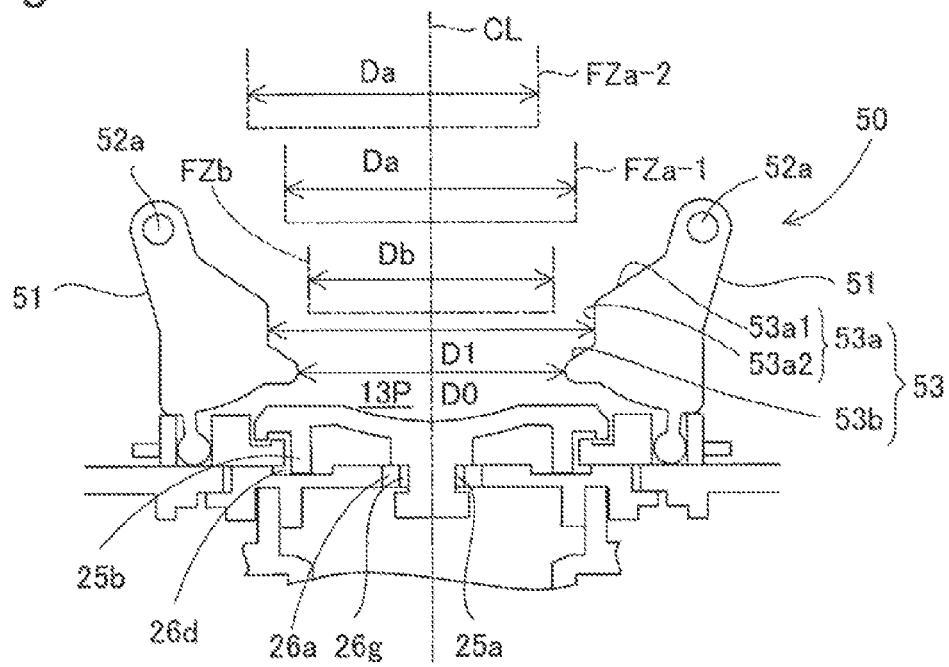
FIG. 13 shows the relationship between the first and second detection part of the introductory push part and the fueling nozzle.

FIG. 13 is an explanatory drawing for explaining the relationship between the first and second detection parts 53a and 53b of the introductory push part 53 and the fueling nozzle FZ. The first and second detection parts 53a and 53b are constituted so that when the end of the fueling nozzle FZ touches them, the nozzle detection member 51 rotates with the shaft 52a as the center. The first detection part 53a is positioned more to the insertion side of the insertion path 13P than the second detection part 53b, is formed with a larger inner diameter than the second detection part 53b, and is equipped with a first detection surface 53a1 that guides the end of the fueling nozzle FZ by tilting so as to shrink the diameter toward the center shaft CL from the introduction port 13Pa (FIG. 4), and a second detection surface 53a2 disposed in parallel in a roughly axial direction (insertion direction) from the bottom part of the first detection surface 53a1. Here, if the inner diameter of the insertion path 13P formed at the inner edge facing opposite the second detection part 53b is D0, the outer diameter of the end of the light oil fueling nozzle (FZa) is Da, and the gasoline fueling nozzle (Fb) is Db, this is set to Db≤D0≤Da. For example, outer diameter Db is set to 20 mm, inner diameter D0 is set to 20 to 21 mm, and outer diameter Da is set to 25 mm. Also, the inner diameter D1 of the insertion path 13P formed at the inner edge facing opposite the second detection surface 53a2 is equal to or slightly larger than the outer diameter Da, and is set to 25 to 26 mm. The first and second detection parts 53a and 53b disposed in this way operate as described below according to the nozzle diameter of the fueling nozzle FZ or the position when the fueling nozzle FZ is inserted in the insertion path 13P. Specifically, when the gasoline fueling nozzle (FZb) is inserted in the insertion path 13P, the end of the fueling nozzle (FZb) passes between the second detection parts 53b, or touches only one of the second detection parts 53b, and does not simultaneously press the second detection parts 53b of both sides. Also, when the light oil fueling nozzle (FZa-1) is inserted to almost the center shaft CL of the insertion path 13P, it passes past the first detection part 53a and simultaneously presses the second detection parts 53b of both sides. Also, when the light oil fueling nozzle (FZa-2) is inserted to a position separated from the almost center shaft CL of the insertion path 13P, it pressed one of the first detection parts 53a, and the other is not pressed. In this way, when the first and second detection parts 53a and 53b are pressed by the end of the fueling nozzle FZ, the locking mechanism 60 is operated cooperatively, and we will describe this locking mechanism 60.

Figure 14A:
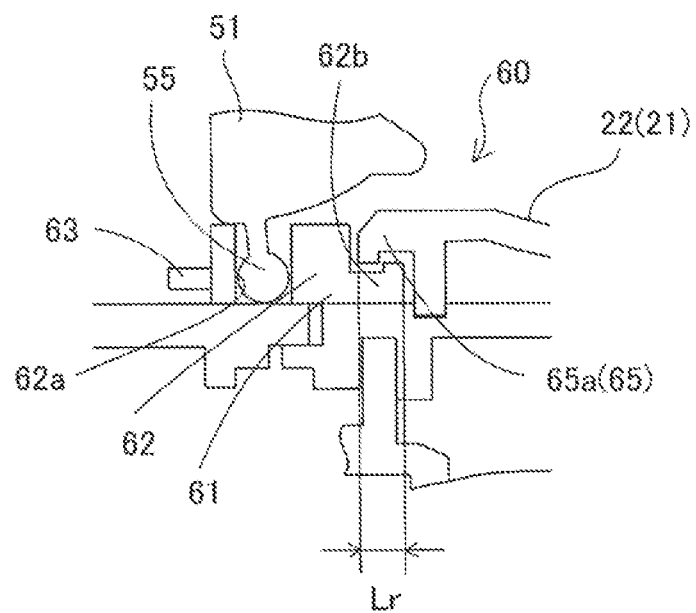
FIG. 14A and FIG. 14B show the locking mechanism constitution and operation.
Figure 14B:
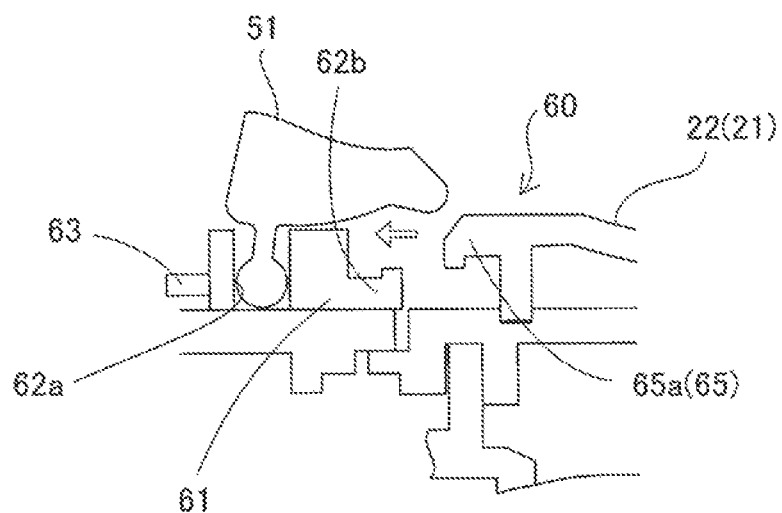

In FIG. 12, the locking mechanism 60 is equipped with a locking member 61 and a locked part 65 formed on the bottom part of the pressing member 22 of the opening-closing member 21. The locking member 61 is equipped with a lock member main body 62 which is a round arc shaped member, and a linking arm 63 which acts as a return spring. The lock member main body 62 is equipped with an engaging recess 62a which engages with the engaging part 55 and a lock engaging part 62b provided projecting to the inner periphery side of the lock member main body 62. FIGS. 14A and 14B are explanatory drawings for explaining the area near where the locking member 61 and the locked part 65 are engaged. The locked part 65 is equipped with a locked engagement part 65a formed at the bottom part of the pressing member 22 of the opening-closing member 21. As shown in FIG. 14A, the locked engagement part 65a is a site for engaging with the lock engaging part 62b, and engages with the overlap width Lr in the radial direction. The state with the lock engaging part 62b engaged with the locked part 65 is the locked position regulating the operation of opening the opening-closing member 21, and as shown in FIG. 14B, by the locking member 61 moving from the center of the opening-closing member 21 to the radial outward direction, the state in which the lock engaging part 62b is removed from the locked part 65 is the unlocked position, and the operation of opening the opening-closing member 21 is permitted. Note that as shown in FIG. 11, to regulate and guide the locking member 61 and the linking arm 63 to within a specified movement range, projections 18c and 18d are provided projecting from the top surface of the inlet forming member 18.

(3) Fuel Tank Opening-Closing Device Opening and Closing Operation

Next, the fueling operation of the fuel tank opening-closing device is described using the fueling nozzle FZ.

(3)-1 Opening Operation

Figure 15A:
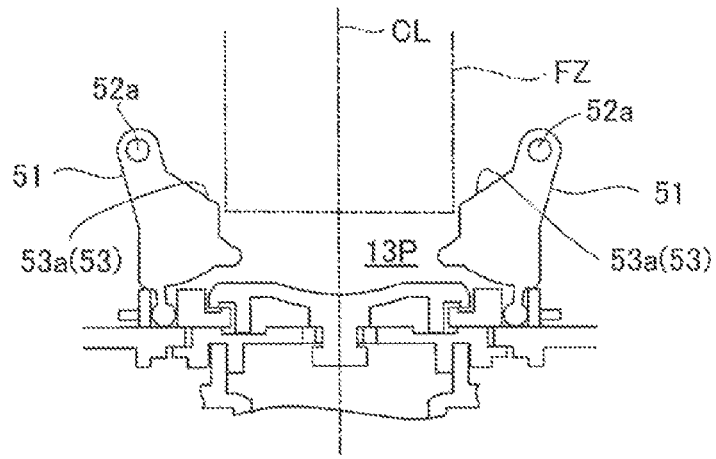
FIG. 15A, FIG. 15B, and FIG. 15C show the operation of the fuel tank opening-closing device during fueling.
Figure 15B:
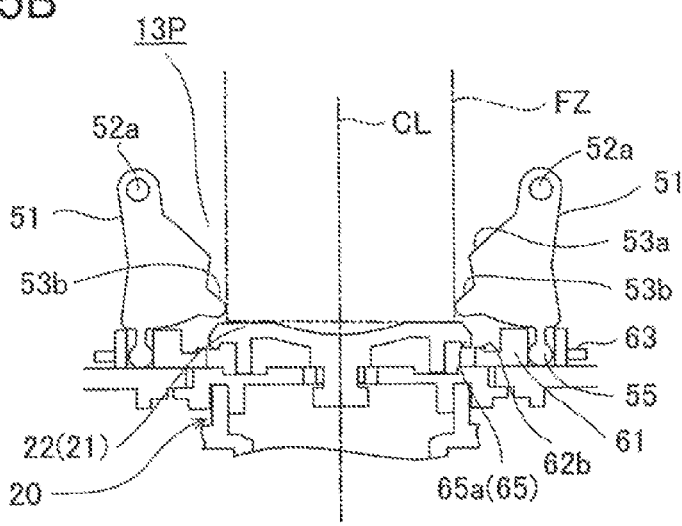
Figure 15C:
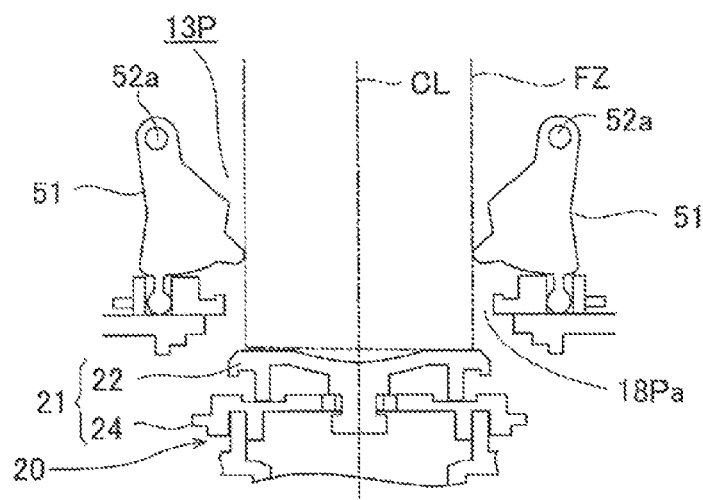

For the description of the fueling operation below, we will divide the explanation into cases when the fueling nozzle FZ is inserted to the center of the insertion path 13P as shown in FIG. 15A, FIG. 15B, and FIG. 15C, and cases with the fueling nozzle FZ inserted in a state at a displaced position from the center of the insertion path 13P as shown in FIG. 16A, FIG. 16B, FIG. 17A, and FIG. 17B.

As shown in FIG. 1, when the fueling cover FL is opened, the fuel tank opening-closing device 10 disposed inside the fuel bay FR appears. As shown in FIG. 3 and FIG. 4, when the fueling nozzle FZ is inserted into the insertion path 13P, as shown in FIG. 15A, when the fueling nozzle FZ is inserted to the almost center shaft CL of the insertion path 13P, and the end of the fueling nozzle FZ does not touch the first detection parts 53a of the nozzle detection member 51, it passes through between those, and as shown in FIG. 15B, it touches both of the second detection parts 53b and presses the second detection parts 53b. By doing this, the nozzle detection members 51 of both sides rotate with the shaft 52a as the center, and the engaging part 55 moves the locking member 61 outward in the radial direction. At this time, the locking member 61 expands in resistance against the elastic force of the linking arm 63 (see FIG. 12). Then, by the lock engaging part 62b of the locking member 61 being removed from a state whereby it is engaged with a specified overlap width (see FIG. 14A) in relation to the locked engagement part 65a of the locked part 65, this switches from the locked position to the unlocked position, in other words, the lock of the opening-closing member 21 of the flap valve mechanism 20 is released, and it becomes possible to do the operation of opening the opening-closing member 21. Then, as shown in FIG. 15C, when the fueling nozzle FZ is further inserted, the end of the fueling nozzle FZ presses the pressing member 22 of the opening-closing member 21, the opening-closing member 21 rotates with the support shaft as the center in resistance to the energization force of the spring 33 (FIG. 3), and the inlet 18Pa opens. In this state, fuel is supplied from the fueling nozzle FZ to the fuel passage 11P.

Figure 16A:
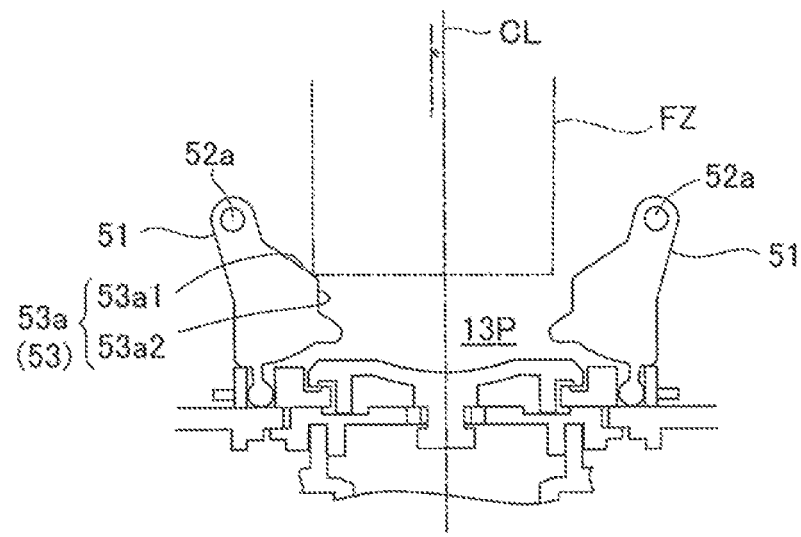
FIG. 16A and FIG. 16B show another operation of the fuel tank opening-closing device during fueling.
Figure 16B:
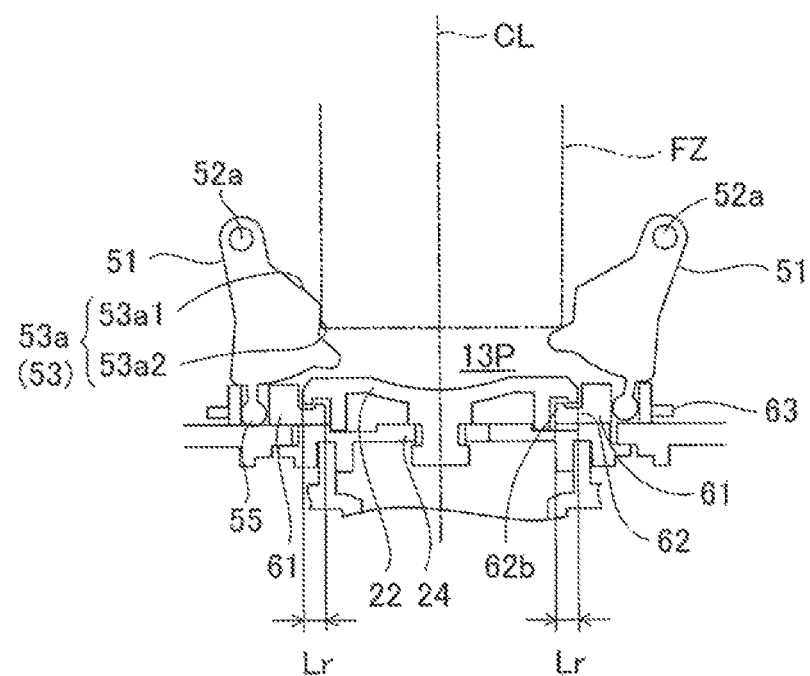
Figure 17A:
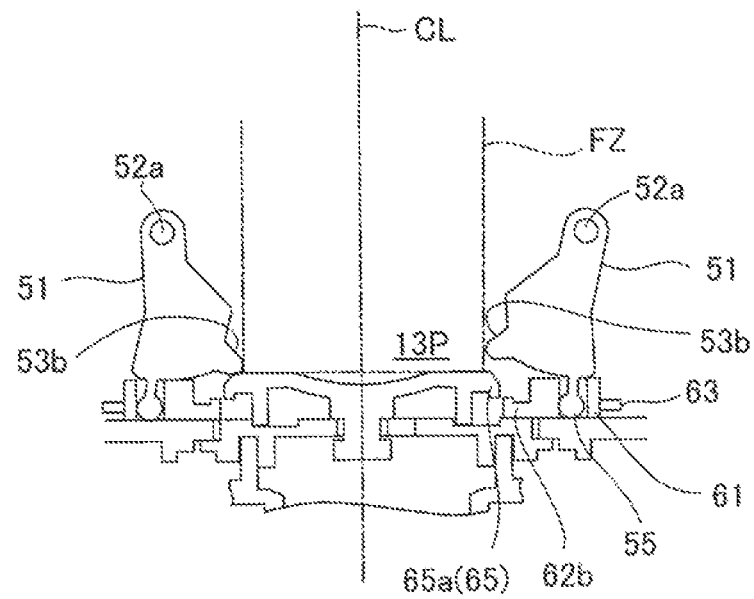
FIG. 17A and FIG. 17B show the operation subsequent to FIG. 16A and FIG. 16B.
Figure 17B:
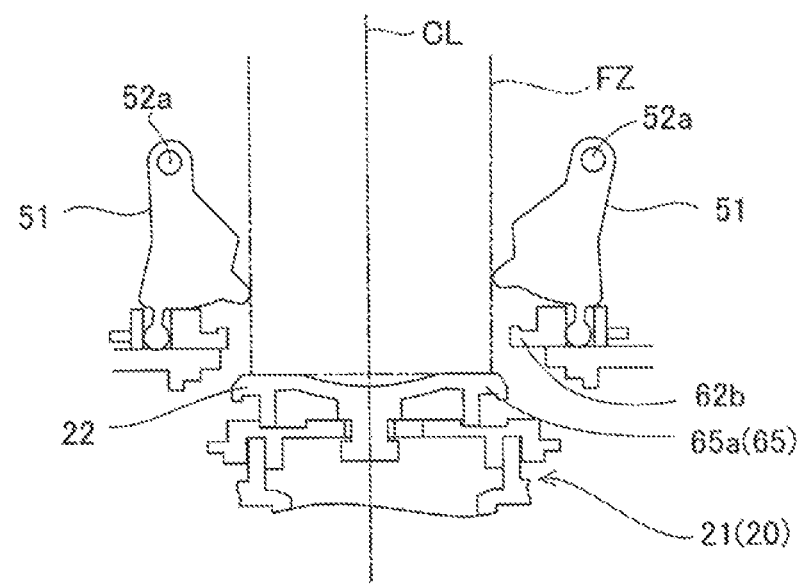

Meanwhile, as shown in FIG. 16A, when the fueling nozzle NZ is inserted at a position separated from the almost center shaft CL of the insertion path 13P, for example the left side in the drawing, the end of the fueling nozzle FZ touches and presses on the first detection surface 53a1 of the one of the first detection parts 53a of the introductory push part 53 of the nozzle detection member 51. Then, as shown in FIG. 16B, one of the nozzle detection members 51 (left side of the drawing) rotates with the shaft 52a as the center so that the first detection surface 53a1, and also the second detection surface 53a2 follows the outer peripheral surface of the shaft 52a. Then, by the rotation of the nozzle detection member 51, one of the locking members 61 moves in the radial outward direction via the engaging part 55. The linking arm 63 (see FIG. 12) linked to the locking member 61 is elastically deformed, and by the other locking member 61 moving in the radial direction (left side in the drawing) via the linking arm 63, the pressing member 22 is pressed by the inner edge part of the locking member 61. By doing this, the pressing member 22 becomes a single unit with the locking member 61 and slides in the radial direction in relation to the cover 24, and the center of the fueling nozzle FZ matches the center of both locking members 61 and the pressing member 22. At this time, because the locking member 61 and the pressing member 22 move as a single unit in the same direction, the overlap width Lr of the lock engaging part 62b and the locked part 65 locked engagement part 65a is kept constant. As shown in FIG. 17A, when the fueling nozzle FZ is further inserted inside the insertion path 13P, the same kind of opening operation is performed as described above when the fueling nozzle FZ is inserted to a normal position. Specifically, the end of the fueling nozzle FZ presses the second detection member 53b, the nozzle detection members 51 of both sides rotate with the shaft 52a as the center, and the locking member 61 expands in resistance to the elastic force of the linking arm 63 via the engaging part 55. Then, by the lock engaging part 62b of the locking members 61 of both sides being removed from the locked part 65, this switches from the locked position to the unlocked position, in other words, the lock of the opening-closing member 21 of the flap valve mechanism 20 is released, and the operation of opening the opening-closing member 21 becomes possible. Then, as shown in FIG. 17B, by further inserting the fueling nozzle FZ, fuel is supplied from the fueling nozzle FZ to the fuel passage 11P.

(3)-2 Closing Operation

When fueling ends, and the fueling nozzle FZ is removed from the inlet 18Pa, the opening-closing member 21 of the flap valve mechanism 20 closes the inlet 18Pa by the restoration force of the spring 33, and furthermore, when the fueling nozzle FZ is removed, the nozzle detection member 51 and the locking member 61 return to the initial position, specifically, the diameter is reduced by the elastic force of the detection support unit 52 and the introductory push part 53 returns to its original position, and also, the locking member 61 moves to the center direction of the opening-closing member 21, and is engaged with a specific overlap width Lr at the locked part 65. By doing this, the opening-closing member 21 returns to its closed initial state at the locked position of the locking member 61, and furthermore, the fueling lid FL (FIG. 1) is closed. Note that as shown in FIG. 10, the pressing member 22 receives the spring force of the clipping part 26g via the first supported projection 25a, and returns to the initial position matching the center of the cover 24.

(4) Operation and Effect of the Fuel Tank Opening-Closing Device

The following operational effects are exhibited by the fuel tank opening-closing device 10 of the embodiment noted above.

(4)-1 As shown in FIG. 16A and FIG. 16B, with the opening-closing activation mechanism 40, when the fueling nozzle FZ is inserted in a state with a displaced position from the center shaft CL of the insertion path 13P, the end of the fueling nozzle FZ touches one of the first detection parts 53a of the nozzle detection member 51, and coordinates with this first detection part 53a, and simultaneously with the other first detection part 53a moving in the same direction, a moving alignment operation is performed while maintaining a constant overlap width Lr for the lock engaging part 62b of the locking members 61 of both sides and the locked engagement part of the locked part 65. Then, after the alignment operation has ended, the end of the fueling nozzle FZ simultaneously presses the second detection parts 53b of both sides, the locking mechanism 60 is moved to the unlocked position so as to simultaneously release the overlap width Lr, and it is possible to do the operation of opening the opening-closing member 21 of the flap valve mechanism 20. Therefore, it is possible to perform the operation of opening the flap valve mechanism 20 reliably without the fueling nozzle FZ being inserted separated from the center shaft CL of the insertion path 13P, the end of the fueling nozzle FZ pressing only one of the introductory push parts 53 and releasing one of the overlap widths Lr, and having just the other overlap width Lr maintained, in other words, without the occurrence of the problem of only one of the unlocked positions not being released.

(4)-2 As shown in FIG. 13, even if the inner diameter D0 of the second detection part 53b, in other words, the inner diameter set to do the opening and closing operation of the flap valve mechanism 20 only by fueling nozzles FZ of a specified nozzle diameter, is made larger than the allowed dimension, the alignment operation is done by the first detection part 53a and the locking mechanism 60, so the end of the fueling nozzle FZ can reliably push the second detector parts 53b of both sides regulated by the inner diameter. Thus, to accurately guide the fueling nozzle FZ to the detection position, it is not necessary to have the insertion path 13P have a strict dimension tolerance of the inner diameter, in other words, it is possible to use an insertion path 13P with a larger allowed dimension of the inner diameter, and it is possible to handle variations of the outer diameters of the fueling nozzles FZ, making the work of inserting the fueling nozzle FZ easier.

(4)-3 The nozzle detection mechanism 50 is equipped with a second detection member 53b disposed so as to be pressed when the outer diameter of the end of the fueling nozzle FZ is a specified diameter or greater, so in the case of a light oil fueling nozzle (FZa), the opening-closing member 21 of the flap valve mechanism 20 performs the opening operation, but in the case of a gasoline fueling nozzle (FZb), the opening-closing member 21 opening operation is not performed. Specifically, the end of the gasoline fueling nozzle (FZb) is displaced from the center shaft CL and inserted in the insertion path 13P, and even if the first and second detection parts 53a and 53b of one of the introductory push parts 53 is pressed, the other introductory push part 53 is not pressed, and the unlocked position is not released. Therefore, when the type of fuel differs according to the outer diameter of the fueling nozzle FZ, even when the fueling nozzle FZ is inserted by mistake, the inlet 18Pa does not open, so there is no supplying of the wrong type of fuel.

(4)-4 The pressing member 22 is a member disposed at the insertion path 13P side in relation to the cover 24 which forms the valve chamber 28S, and since it protects the cover 24 and the valve, no great force is applied to the pressure regulating valve 30 from the fueling nozzle FZ. Also, even if the pressing member 22 receives a large force from the fueling nozzle FZ and is damaged, the pressure regulating valve 30 does not easily reach the point of damaging the cover 24, so there is no problem for operation.

(4)-5 The pressing member 22 is mounted on the valve chamber defining member 28 as a separate member from the cover 24, so it is possible to replace the pressing member 22 if it is damaged.

(4)-6 The pressing member 22 of the opening-closing member 21 is supported by the sliding mechanism 25 to be able to slide in relation to the cover 24, so when excessive force is received from the fueling nozzle FZ on the pressing member 22, by sliding in relation to the cover 24, the force applied to the pressing member 22 is allowed to escape, making it possible to prevent damage.

(4)-7 Between the pressing member 22 and the cover 24 is a constitution forming a valve path connected from the insertion path 13P to the valve chamber 28S. with this constitution, it is possible effectively use the space between the pressing member 22 and the cover 24 as the valve path.

B. Second Embodiment

Figure 18:
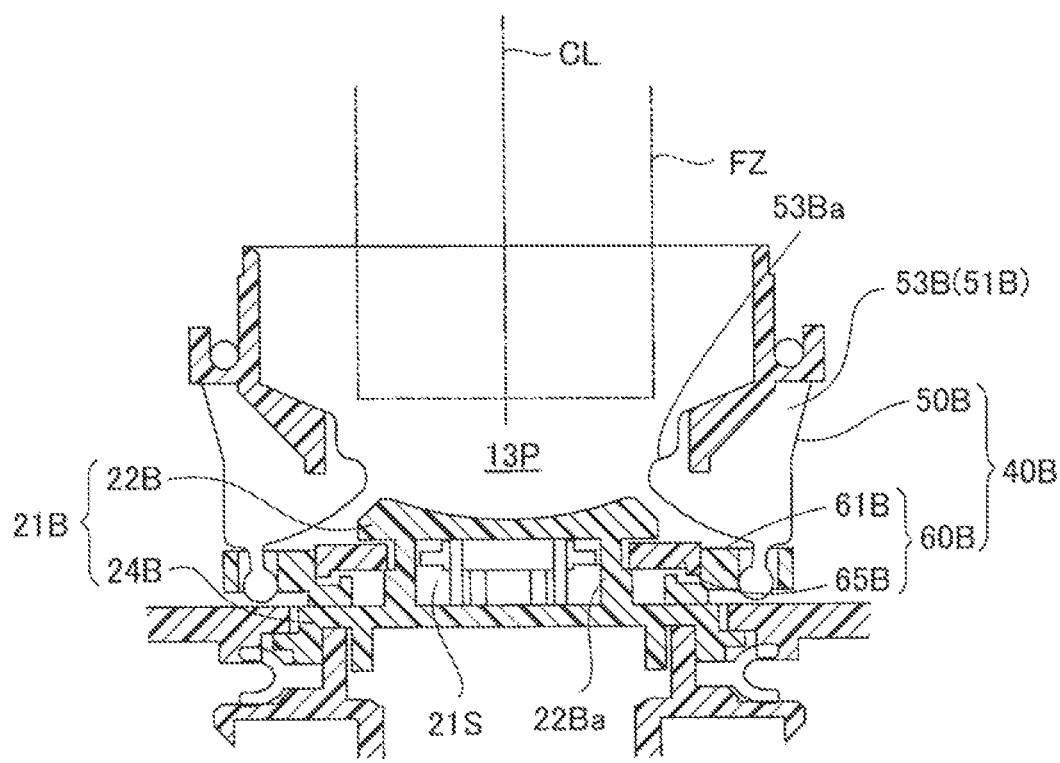
FIG. 18 is a cross section view showing near the opening-closing activation mechanism of the fuel tank opening-closing device of the second embodiment.
Figure 19:
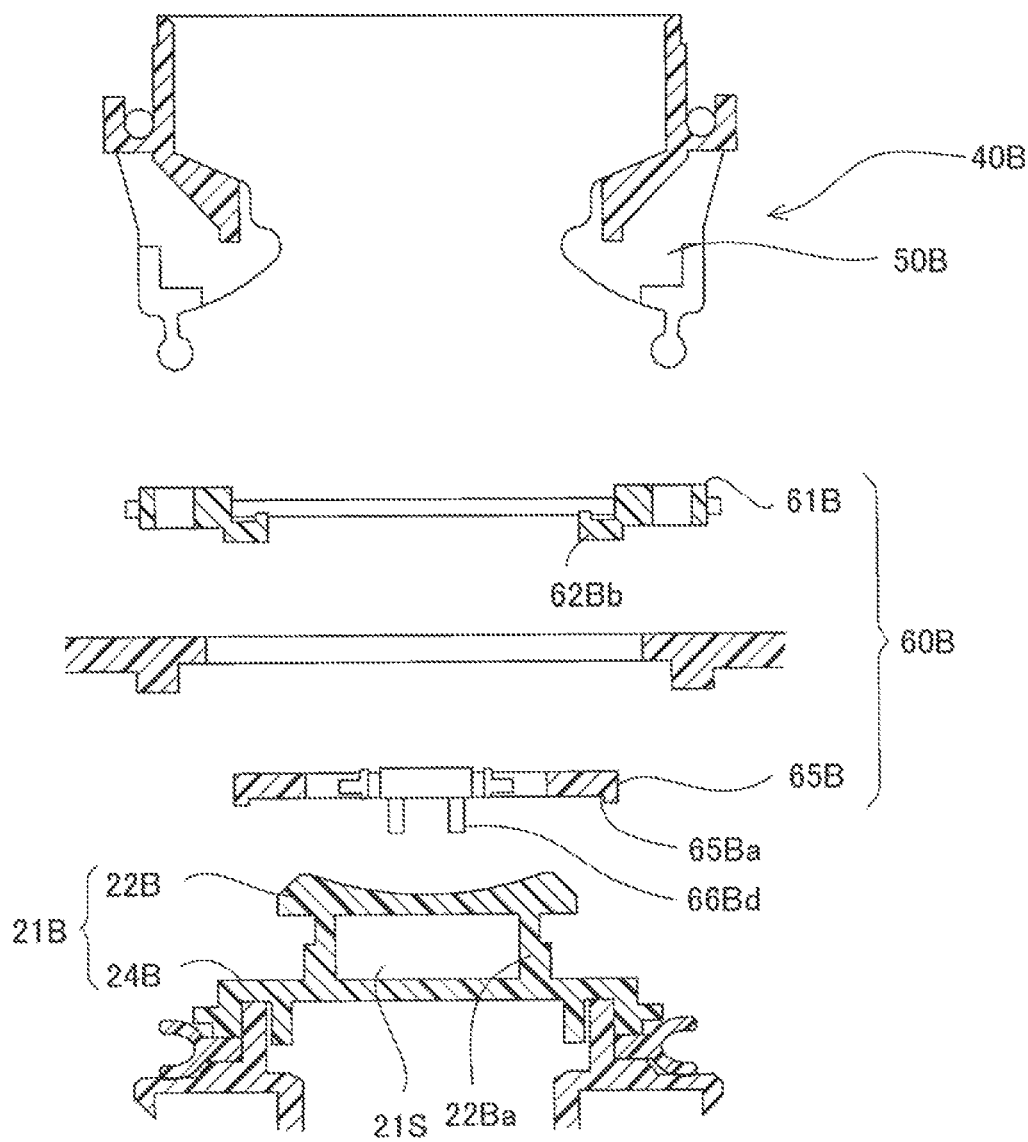
FIG. 19 is an exploded cross section view of the opening-closing activation mechanism of FIG. 18.

FIG. 18 is a cross section view showing near the opening-closing activation mechanism 40B of the fuel tank opening-closing device of the second embodiment, and FIG. 19 is an exploded cross section view of the opening-closing activation mechanism 40B of FIG. 18. This embodiment is characterized in that it has a constitution whereby the locked part 65B constituting the locking mechanism 60B of the opening-closing activation mechanism 40B is a separate unit from the member which receives the pressing force of the fueling nozzle FZ. The opening-closing member 21B is equipped with the pressing member 22B which receives the pressing force by the end of the fueling nozzle FZ and the cover 24B, the support legs 22Ba are formed between the pressing member 22B and the cover 24B, and between those is the space 21S for storage. The locked part 65B constituting the locking mechanism 60B is disposed to be able to slide on the cover 24B in the space 21S for storage between the support legs 22Ba.

Figure 20:
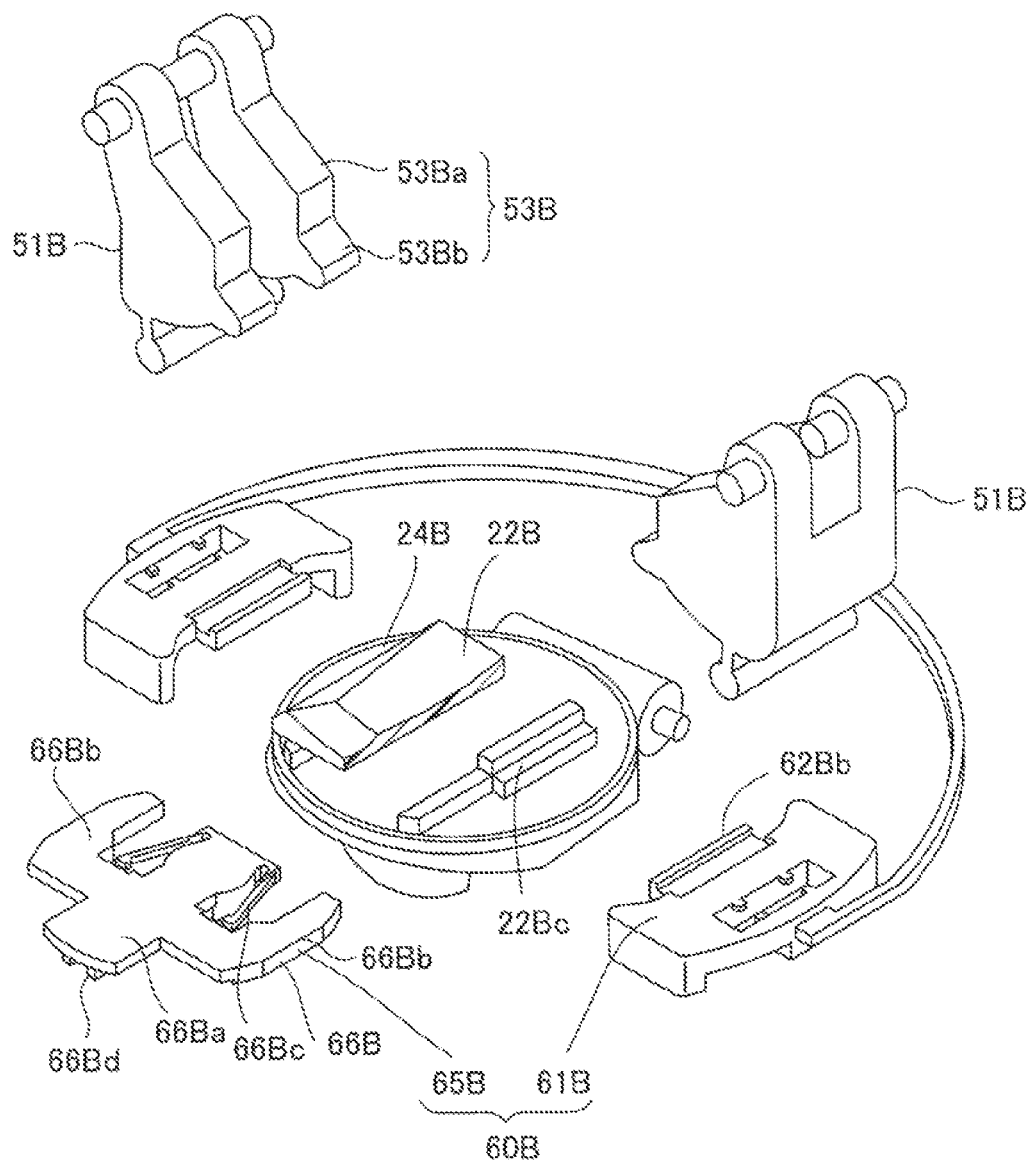
FIG. 20 is an exploded perspective view for explaining the opening-closing activation mechanism.

FIG. 20 is an exploded perspective view for explaining the opening-closing activation mechanism 40B, and part of the opening-closing member 21B is broken out for viewing. The locked part 65B is equipped with a board shaped locked main body 66B, and sites for providing each function are formed on the locked main body 66B. The locked main body 66B is equipped with a body 66Ba with a long, thin center, a support extension part 66Bb that expands in a wing shape at both sides of the body 66Ba, and a return spring 66Bc respectively projecting from both sides of the end part of the body 66Ba and formed from a cantilever beam. At the back surface side of the support extension part 66Bb of the locked part 65B is formed the locked engagement part 65Ba (FIG. 19). The locked engagement part 65Ba is a site for engaging with the lock engaging part 62Bb. With the locked part 65B, the support leg 22Ba is inserted between the body 66Ba and the support extension part 66Bb, and by this support leg 22Ba being grasped by the spring 66Bc, this is supported to be able to slide on the cover 24B, and the force that returns the locked part 65B to the initial position at the center of the cover 24B is applied by the spring 66Bc. Also, at the back surface side of the body 66Ba of the locked part 65B is formed a guide projection 66Bd which is supported on the cover 24B.

Figure 21A:
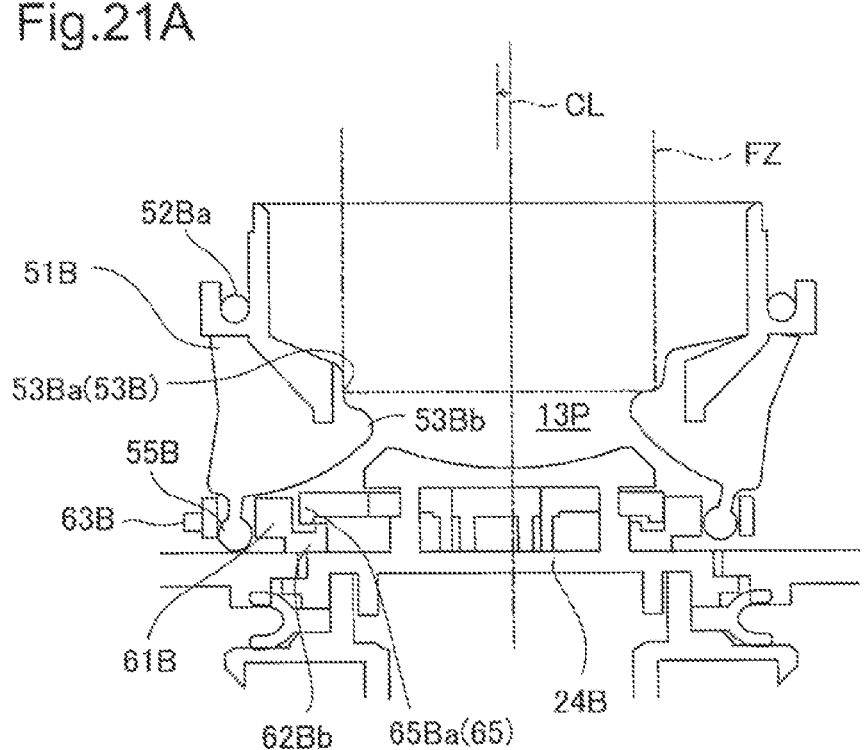
FIG. 21A and FIG. 21B show the operation of the fuel tank opening-closing device of the second embodiment.
Figure 21B:
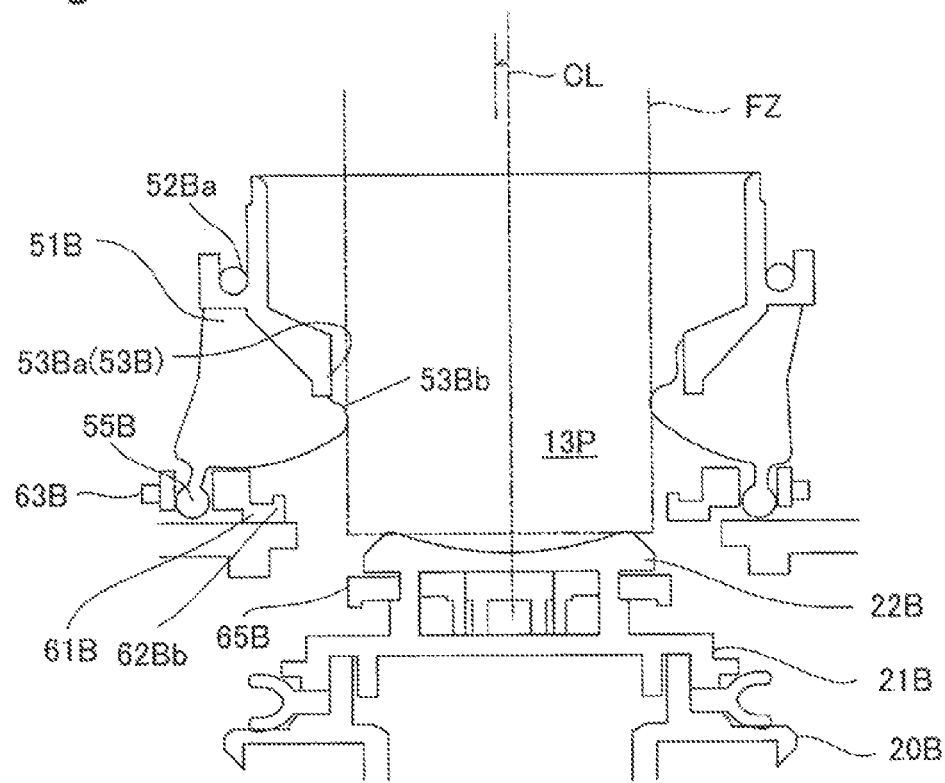

We will describe the operation of the opening-closing activation mechanism 40B that occurs with insertion of the fueling nozzle FZ during fueling. As shown in FIG. 18, when the fueling nozzle FZ is inserted to the center of the insertion path 13P, the end of the fueling nozzle FZ does not touch the first detection part 53Ba of the introductory push parts 53B of the nozzle detection member 51B, and passes between these, so the opening operation is performed in the same way as with the first embodiment. Meanwhile, as shown in FIG. 21 (A), when the fueling nozzle FZ is inserted to a position separated from the almost center of the insertion path 13P (left side of the drawing), the end of the fueling nozzle FZ touches and pushes one of the first detection parts 53Ba of the introductory push part 53B of the nozzle detection member 51B. By doing this, one of the nozzle detection members 51B (left side in the drawing) rotates with the shaft 52Ba as the center, and one of the locking members 61B moves in the radial outward direction via the engaging part 55B, and also, the other locking member 61B also moves in the radial direction (left side in the drawing) via the linking arm 63B (see FIG. 2) of the locking member 61B. By doing this, the locked part 65B becomes a single unit with the locking member 61B and slides in the radial direction in relation to the cover 24B. At this time, since the locking member 61B and the locked part 65B move as a single unit in the same direction, the overlap width of the lock engaging part 62Bb and the locked part 65B is kept constant. Then, as shown in FIG. 21 (B), when the fueling nozzle FZ is further inserted inside the insertion path 13P, the same opening operation is performed as when as described above, the fueling nozzle FZ is inserted to a regular position. Specifically, the end of the fueling nozzle FZ pushes the second detection part 53b, the nozzle detection members 51B of both sides rotate with the shaft 52Ba as the center, and the locking member 61B expands in resistance to the elastic force of the linking arm 63B via the engaging part 55B. Then, by the lock engaging part 62Bb of the locking member 61B being removed from the locked part 65B, it switches from the locked position to the unlocked position, in other words, the lock of the opening-closing member 21B of the flap valve mechanism 20B is released, and it is possible to do the operation of opening the opening-closing member 21B. Then, when the fueling nozzle FZ is further inserted, the end of the fueling nozzle FZ presses the pressing member 22B of the opening-closing member 21B, and the opening-closing member 21B does the opening operation.

With the embodiments, when the fueling nozzle FZ is inserted to a position separated from the center of the insertion path 13P, the pressing member 22B and a locked part 65Bg which is a separate member move so as to keep the overlap width constant via the first detection part 53Ba and the locking member 61B. Thus, more than when the locked part is provided on the pressing member 22B, a large movement force is not directly received by the locked part 65B from the fueling nozzle FZ, so this is excellent in terms of durability, and changes do not occur easily over time to the overlap width.

The cover 24B is disposed across a space in relation to the pressing member 22B, and since this space acts as a space for easing the external force applied to the pressing member 22B, it is possible to prevent damage to the cover 24B.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank opening-closing device for opening and closing a path for supplying fuel to a fuel tank, the fuel tank opening-closing device comprising:
  a tank opening forming member that includes (i) a fuel path connected to the fuel tank, (ii) an insertion path for inserting a fueling nozzle, and (iii) an inlet disposed between the fuel path and the insertion path;
  a flap valve mechanism that is disposed inside the tank opening forming member, and has an opening-closing member for opening and closing the inlet by being pressed by an end of the fueling nozzle; and
  an opening-closing activation mechanism that switches (i) a locked position in which the opening operation of the opening-closing member is locked, and (ii) an unlocked position in which the opening operation of the opening-closing member is permitted by pressing operation of the fueling nozzle;
  wherein the opening-closing activation mechanism includes:
  a nozzle detection mechanism mounted on the tank opening forming member and disposed facing the insertion path, having first detection parts and second detection parts for receiving movement force in an insertion direction by the fueling nozzle, wherein the first detection parts are respectively positioned further to an insertion side of the insertion path than the second detection parts and have a greater inner diameter than the second detection parts; and
  a locking mechanism having (i) a locking member which has lock engaging parts disposed at a periphery of the inlet and (ii) a locked part having locked engagement parts that engage and disengage respectively with the lock engaging parts with an overlap width within a preset range, the locking mechanism being configured to selectively switch between the unlocked position and the locked position by engaging and disengaging with the lock engaging parts and the locked engagement parts,
  wherein the first detection parts are linked with the locking member and the locked part so as to move the lock engaging part and the locked engagement part while maintaining each of the overlap widths within the preset range, by being pressed by the end of the fueling nozzle, and
  the second detection parts are linked to the locking member so as to move from the locked position to the unlocked position by releasing the overlap width by being pressed by the end of the fueling nozzle.

2. The fuel tank opening-closing device according to claim 1 wherein
  the locking member includes a linking arm linking the lock engaging parts, wherein the linking arm is configured to create return force in a center direction of the inlet by movement of the lock engaging part in an outward diameter direction of the inlet.

3. The fuel tank opening-closing device according to claim 1 wherein
  the lock engaging parts and the locked engagement parts are respectively disposed at both sides of the diameter direction of the insertion path.

4. The fuel tank opening-closing device according to claim 3 wherein
  the nozzle detecting mechanism includes nozzle detection members comprising the first detection parts and the second detection parts, wherein the nozzle detection members are configured to rotate in relation to the tank opening forming member via a shaft attached to the tank opening forming member.

5. The fuel tank opening-closing device according to claim 1 wherein
  the opening-closing member includes a pressing member pressed by the end of the fueling nozzle and a cover for supporting the pressing member to be able to slide in the radial direction, wherein the pressing member includes the locked part.

6. The fuel tank opening-closing device according to claim 5 wherein
  the opening-closing member includes a sliding mechanism for returning the pressing member to a center position of the opening-closing member.

7. The fuel tank opening-closing device according to claim 6 wherein
the sliding mechanism includes (i) a first support projection formed on the pressing member, and (ii) a flexing piece formed from a cantilever beam and formed on the cover, and grasps both sides of the first support projection, wherein the flexing piece is configured to move the pressing member toward the center of the cover.

8. The fuel tank opening-closing device according to claim 1 wherein
the opening-closing member includes a pressing member pressed by the end of the fueling nozzle, and a cover mounted on the pressing member with a space, wherein the locked part is disposed in the space in a slidable manner.

9. A fuel tank opening-closing device for opening and closing a path for supplying fuel to a fuel tank, the fuel tank opening-closing device comprising:
a tank opening forming member that includes (i) a fuel path connected to the fuel tank, (ii) an insertion path for inserting a fueling nozzle, and (iii) an inlet disposed between the fuel path and the insertion path; and
a flap valve mechanism that is disposed inside the tank opening forming member, and has an opening-closing member for opening and closing the inlet by being pressed by an end of the fueling nozzle;
wherein the opening-closing member includes:
a valve chamber defining member that has a concave that opens toward the insertion path side;
a cover that defines a valve chamber by covering an opening of the concave;
a pressure regulating valve that is stored in the valve chamber for adjusting pressure between the insertion path and the fuel passage within a preset pressure range; and
a pressing member that is disposed above the cover and receives an opening force to the opening-closing member by being pressed by the end of the fueling nozzle, thereby reducing the opening force to the cover.

10. The fuel tank opening-closing device according to claim 9 wherein
the pressing member is mounted on the valve chamber defining member as a separate member from the cover.

11. The fuel tank opening-closing device according to claim 10 wherein
the opening-closing member includes a sliding mechanism that supports the pressing member to be able to slide in relation to the cover.

12. The fuel tank opening-closing device according to claim 11 further comprising:
an opening-closing activation mechanism that switches an opening-closing activation mechanism that can switch a locked position and an unlocked position, wherein the locked position is a position in which the opening operation of the opening-closing member is locked, and the unlocked position is a position in which the opening operation of the opening-closing member is permitted by pressing operation of the fueling nozzle;
wherein the opening-closing activation mechanism includes:
a nozzle detection mechanism mounted on the tank opening forming member and disposed facing the insertion path, and having a nozzle detection member for receiving movement force in an insertion direction by the fueling nozzle; and
a locking mechanism having (i) a locking member which has lock engaging parts disposed at a periphery of the inlet and (ii) a locked part having locked engagement parts that engage and disengage respectively with the lock engaging parts, the locking mechanism being configured to selectively taking the unlocked position and the locked position by engaging and disengaging with the lock engaging parts and the locked engagement parts, wherein the locked parts are formed on the pressing member.

13. The fuel tank opening-closing device according to claim 11 wherein
the sliding mechanism includes (i) a first support projection formed on the pressing member, and (ii) a flexing piece formed from a cantilever beam and formed on the cover, and grasps both sides of the first support projection, wherein the flexing piece is configured to move the pressing member toward the center of the cover.

14. The fuel tank opening-closing device according to claim 12 wherein
a space is provided between the pressing member and the cover mounted thereon, and the locked parts are disposed in the space in a slidable manner.

15. The fuel tank opening-closing device according to claim 14 further comprising:
an opening-closing activation mechanism that can switch a locked position and an unlocked position, wherein the locked position is a position in which the opening operation of the opening-closing member is locked, and the unlocked position is a position in which the opening operation of the opening-closing member is permitted by pressing operation of the fueling nozzle;
wherein the opening-closing activation mechanism includes:
a nozzle detection mechanism having a nozzle detection member mounted on the tank opening forming member and disposed facing the insertion path for receiving movement force in an insertion direction by the fueling nozzle, and
a locking mechanism that has (i) a locking member having a lock engaging part disposed at a periphery of the inlet, and (ii) a locked part having a locked engagement part that engages and disengages with the lock engaging part, wherein the locking mechanism is configured to selectively take the unlocked position and the locked position by engaging and disengaging the lock engaging part and the locked engagement part in coordination with the nozzle detection member,
wherein the locked part is disposed so as to be able to slide in the space between the pressing member and the cover.

16. The fuel tank opening-closing device according to claim 9 wherein
the opening-closing member includes a valve path that is formed between the pressing member and the cover for connecting the insertion path and the valve chamber.

* * * * *